United States Patent [19]

Schroeder et al.

[11] 4,324,533
[45] Apr. 13, 1982

[54] UNIVERSAL GUARD

[75] Inventors: Earle E. Schroeder, New Richmond; James E. Baker, Amelia, both of Ohio

[73] Assignee: Allis-Chalmers Corporation, Milwaukee, Wis.

[21] Appl. No.: 121,670

[22] Filed: Feb. 15, 1980

[51] Int. Cl.³ .......................... F16P 3/00; F16D 3/84
[52] U.S. Cl. .................... 417/360; 64/32 R; 74/612; 403/11; 403/23
[58] Field of Search .................. 403/11, 23, 286; 64/32 R, 3, 4; 417/319, 359, 360; 74/612

[56] References Cited

U.S. PATENT DOCUMENTS

| 1,040,417 | 10/1912 | Rhodes | 64/32 R |
| 1,192,342 | 7/1916 | Pelton | 64/32 R X |
| 1,236,768 | 8/1917 | Sarmiento | 64/32 R |
| 2,912,837 | 11/1959 | Brodbeck | 64/4 X |
| 3,805,553 | 4/1974 | Yehl | 64/32 R |
| 3,874,194 | 4/1975 | Filepp et al. | 64/32 R X |
| 4,004,436 | 1/1977 | Mott | 64/32 R |
| 4,073,591 | 2/1978 | Heitzman | 403/23 X |

Primary Examiner—Leonard E. Smith
Attorney, Agent, or Firm—Robert C. Jones; Lee H. Kaiser

[57] ABSTRACT

A four part guard assembly for the rotating drive connection between a drive motor and a pump. The guard assembly being rigidly and removably secured to the frame of the pump and extending to a point short of the drive motor and encompassing the drive connection therebetween. The sleeve is of two part construction removably secured together to permit removal of one part for gaining access to the drive connection for field servicing maintaining the remaining components in assembled condition.

1 Claim, 5 Drawing Figures

U.S. Patent    Apr. 13, 1982    4,324,533
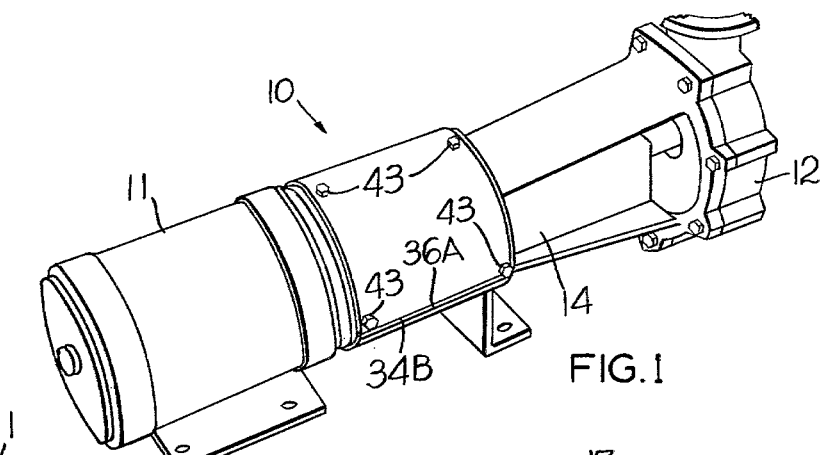
FIG. 1
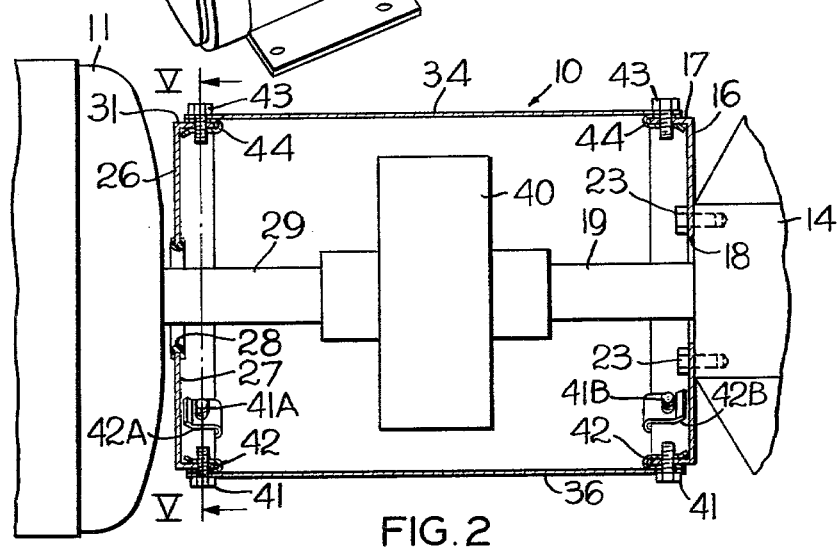
FIG. 2
FIG. 3    FIG. 4    FIG. 5

UNIVERSAL GUARD

BACKGROUND OF THE INVENTION

Today, the moving parts of machinery and their moving components must be exceedingly well protected so as to provide a safeguard against injury even to the most careless of working personnel. In this respect, machinery pumps, their associated drive motors and connecting shafting and couplings are areas of potential danger which require guarding to prevent inadvertant contact with the rotating shafts. Heretofore, such guarding was accomplished by base standing housings constructed of multiple parts and special shaft adapters. These guards were relatively costly to manufacture and because of the different sizes of pumps and motors required, the inventorying of various sizes so as to meet the request of various applications is very burdensome.

A major problem with known guards are that they are not universal and are not easily dissembled or assembled when servicing is required or an associated pump or its drive motor.

It is a general purpose of this invention to provide a universal guard for rotating elements of pump shafts, motor shafts and connecting couplings.

Still another object of the present invention is to provide a guard which is constructed and arranged to facilitate dissembly and assembly of the guard in its operational environment.

Yet another object of the present invention is to provide a guard assembly which provides for a single removable cover for providing access to the protected parts while leaving the remaining portion of the guard assembly in operative position.

SUMMARY OF THE INVENTION

The universal guard assembly of the present invention is a four part assembly which is secured to the motor frame and extends in cantilever fashion therefrom to an associated pump surrounding the rotatable shafting and connecting coupling. Servicing of the guarded rotating components is facilitated because it is only necessary to remove a single part from the guard assembly leaving the balance of the assembly secured to the pump.

DESCRIPTION OF THE DRAWINGS

FIG. 1 is a perspective view of a pump driven by a motor through a rotatable shaft connection, showing the universal guard in operative protective position;

FIG. 2 is a view in vertical cross-section of a motor end cap;

FIG. 3 is a side view of the pump end cap;

FIG. 4 is a front view of the pump end cap;

FIG. 5 is a view through the guard sleeve taken in a plane represented by the line V—V in FIG. 2, showing the connection between the top and bottom sleeves.

DESCRIPTION OF THE INVENTION

As shown in FIG. 1, the coupling guard 10 of this invention is shown in position enclosing the rotatable drive connection between a drive motor 11 and a pump 12. The guard 10 is constructed and arranged to meet ANSI specification No. B15.1-1972, providing adequate strength and clearance around hazzardous machinery. The guard 10 as conceived is a five part assembly attached to the frame 14 of the pump 12 and suspended at the motor end, to protect from injury personnel having occasion to be near the rotating elements during pump operation.

As shown in FIGS. 2, 3 and 4, the guard assembly 10 is attached to the frame 14 of the pump 12 and is suspended at the motor end. The arrangement totally encloses the rotating elements offering maximum protection from injury to personnel around the pump. As shown in the drawing, the guard includes a pump end cap 16 which is first attached to the pump frame 14. To this end, the end cap 16 is formed as a circular disc having an annular axially extending flange 17. An axial opening 18 is formed in the disc surface and is adapted to encompass the pump shaft 19 without mechanical interference. For fastening the end cap 16 to the pump housing a plurality of screw slots or races 22, 22A, 22B and 22C are formed in the disc surface. These slots extend radially from the axis of the end cap and are spaced 90° apart as shown in FIG. 3. Hex headed cap screws 23 are inserted through the slots 22 and are threadedly engaged in suitable tapped openings in the end of the pump frame. By reason of the radial slot concept, the pump end cap 16 can be easily centered around the pump shaft 19 for providing the proper clearance.

At the opposite end, the guard 10 is provided with a motor end cap 26 similar to the pump end cap 16. The cap 26 includes a circular base 27 having an axial opening 28 adapted to receive the drive shaft 29 of the drive motor 11. The annular flange 31 formed around the periphery of the circular base 27 extends inwardly towards the pump motor end cap 16, as shown.

The outer sleeve or shell of the guard 10 is formed of two semi-cylindrical steel sleeve pieces 34 and 36. As shown in FIG. 5, one longitudinal edge of the upper sleeve piece 34 is deformed inwardly as at 34A to a depth equal to the thickness of the material from which the sleeve piece is rolled. This arrangement provides for receiving the longitudinal edge portion 36B of the bottom sleeve piece 36. Similarly the bottom or lower sleeve piece 36 has one longitudinal edge deformed inwardly as at 36A, to a depth equal to the thickness of the sleeve material. Thus, when the two sleeve pieces 34 and 36 are assembled, the undeformed longitudinal edge 34B of sleeve piece 34 will seat in the longitudinal offset of the deformed longitudinal edge 36A of sleeve piece 36. Similarly, the undeformed longitudinal edge 36B of sleeve piece 36 will seat in the offset formed by the deformed longitudinal edge 34A of sleeve piece 34. Thus, a smooth contour for the assembled sleeve is provided, reducing to a minimum any protruding steel edge on which personnel may be injured.

The guard is assembled with the pump 11 and motor 12 disconnected. The pump end cap 16 is first slipped over the pump drive shaft 19 and then fastened to the pump housing as with cap screws 23. The motor end cap 26 is slid onto the motor shaft 29 remaining there in a loose or free condition. Coupling 40 is then assembled to drivingly connect the motor drive shaft 29 to the pump shaft 19. Next the lower guard sleeve piece 36 is fastened to the pump and motor end caps by a plurality of screws 41 and spring screw retainers 42. Finally, the upper or top half of the guard sleeve 34 is fastened to the pump and motor end caps by screws 43 and spring screw retainers 44. The relationship of the assembled cylindrical sleeve guards 34 and 36 in assembled condition are depicted in FIG. 5. With this arrangement, the guard presents a rigid structure which has an aesthetically pleasing appearance and present, no sharp edges.

When field servicing is required, the upper guard sleeve member 34, serves as a removable guard hood, is removed leaving the balance of the guard in position. Thus, minimum parts are removed in the field reducing the possibility of loss of parts or damage thereto.

The lower guard sleeve piece 36 is firmly maintained in position by the screws 41 which, as shown in FIGS. 2 and 5, are six in number, three to each end engaging in the flange of the respective end caps 16 and 26. By providing the intermediate screws 41A and 41B at each end of the lower guard sleeve piece 36, they operate to prevent the sleeve from spreading away from the end caps when the top or upper sleeve piece 34 is removed. Thus, the corners and edges of the lower guard sleeve piece 36 will not be likely to injure servicing personnel.

The embodiments of the invention in which an exclusive property or privilege is claimed are defined as follows:

1. A guard for a rotating drive connection between a drive motor and a pump, comprising:
   a first elongated semi-cylindrical guard sleeve member having one longitudinal edge deformed to provide a seat;
   a second elongated semi-cylindrical guard sleeve member having one longitudinal edge deformed to provide a seat for the non-deformed longitudinal edge of said first guard sleeve member and its other longitudinal edge seated within said seat provided by said deformed longitudinal edge of said first guard sleeve member so that the assembled first and second guard sleeve members present a substantially smooth contour without protruding edges;
   a circular pump motor end cap, said end cap having an annular flange extending parallel to the axis of the pump motor shaft toward said drive motor and an axial opening adapted to receive the pump motor shaft with adequate clearance;
   fastening means to removably secure said pump motor end cap to the pump frame in position where the pump shaft may rotate freely without striking said pump motor end cap;
   a circular drive motor end cap having an annular flange extending parallel to the axis of said pump motor shaft toward said pump frame and an axial opening adapted to fit over the drive shaft of the drive motor;
   first removable means to secure said first guard sleeve member to said annular flange of said pump motor end cap;
   second removable means to secure said second guard sleeve member to said annular flange of said pump motor end cap; and
   means to removably secure said first and second guard sleeve members to said annular flange of said motor end cap, whereby said guard is secured solely to the frame of the pump and encloses the rotating drive connection between the motor and pump in extended cantilever fashion.

* * * * *